United States Patent [19]

Bastian et al.

[11] 4,272,040

[45] Jun. 9, 1981

[54] AERODYNAMIC CONTROL MECHANISM FOR THRUST VECTOR CONTROL

[75] Inventors: Thomas W. Bastian, Fullerton; Garry T. Lacy, Claremont; John J. Vink, Geyserville, all of Calif.

[73] Assignee: General Dynamics, Pomona Division, Pomona, Calif.

[21] Appl. No.: 924,594

[22] Filed: Jul. 14, 1978

[51] Int. Cl.³ .................................................. F42B 15/18
[52] U.S. Cl. ...................................... 244/3.22; 60/230; 239/265.19
[58] Field of Search ................... 244/3.21, 3.22, 3.29, 244/3.1; 239/265.19; 60/230; 74/675

[56] References Cited

U.S. PATENT DOCUMENTS

| | | | |
|---|---|---|---|
| 2,501,908 | 3/1950 | Nichols | 74/675 X |
| 2,517,680 | 8/1950 | Knowler et al. | 74/675 X |
| 2,851,905 | 9/1958 | Clark | 74/675 |
| 2,942,496 | 6/1960 | Dietrich et al. | 74/675 |
| 2,969,017 | 1/1961 | Kershner | 244/3.21 |
| 2,969,696 | 1/1961 | Fraga | 74/675 X |
| 3,139,033 | 6/1964 | Geissler et al. | 244/3.22 |
| 3,359,818 | 12/1967 | Deverell et al. | 74/675 X |
| 3,457,806 | 7/1969 | Weiland | 74/675 |
| 3,575,065 | 4/1971 | Kell | 74/675 X |
| 4,044,970 | 8/1977 | Maudal | 244/3.22 |

*Primary Examiner*—David H. Brown
*Attorney, Agent, or Firm*—Henry M. Bissell; Edward B. Johnson

[57] ABSTRACT

A rocket thrust vector control system including jet tabs and aerodynamic control surfaces is disclosed. The control system removes roll information present in commands to the aerodynamic surfaces and provides only pitch and yaw information to the jet tabs for the thrust vector control. The roll information is removed by a geared summing mechanism. The resulting pitch and yaw output is used to drive the thrust vector control jet tabs. The same powered actuators are used for both the aerodynamic control surfaces and the jet tabs.

13 Claims, 8 Drawing Figures

AERODYNAMIC CONTROL MECHANISM FOR THRUST VECTOR CONTROL

BACKGROUND OF THE INVENTION

1. Field of the Invention

The present invention relates to missile control systems, and particularly relates to a thrust vector control for jet tab actuators coupled to an aerodynamic control system employing a geared summing mechanism.

2. Description of the Prior Art

It is known in the art to provide jet tabs for controlling the thrust vector. The jet tabs are movable into the rocket exhaust stream for controlling the flight path of a jet or rocket-driven vehicle, such as a missile. Such a system serves to enhance or supplement the attitude control usually provided by aerodynamic control surfaces.

When a rocket vehicle, such as a missile, is launched from the earth, the initial flight is at relatively low speeds. During this portion of the flight the aerodynamic control surfaces of the missile are less effective than during later periods of the flight where the speed is much higher. Hence, during a typical, low-speed launch period, thrust vector control may be effective to augment pitch and yaw control.

While the vehicle travels at certain altitudes and speeds, significant aerodynamic effects may be obtained by the control surfaces. In that case, thrust vector control may not be necessary. However, at higher altitudes, the aerodynamic effects are reduced due to low atmospheric density. In this case, pitch and yaw attitude control may be enhanced again or may only be available by thrust vector control.

Jet tabs for thrust vector control are inserted into the missile exhaust flow where they deflect the exhaust gases. This, of course, provides control moments. Such jet tabs are effective for providing pitch and yaw attitude control. However, they are ineffective to provide roll control. Hence for roll control, reliance is usually placed on aerodynamic surfaces or on different types of thrust vector control, such as separate jets having an exhaust flow forming an angle with the longitudinal axis of the vehicle.

Conventional thrust vector control by tab actuator systems generally employ power actuators which are independent of the actuators for the movable aerodynamic surfaces. In such prior systems, pitch, roll and yaw commands are provided to the aerodynamic control surface actuators. On the other hand, only pitch and yaw commands are provided to the thrust vector control of the jet tabs. Hence, two separate sets of commands and two separate sets of actuators are required, thus increasing the weight and complexity of the missile.

Devices which may generally be categorized as geared summing mechanisms have been employed in machines of various kinds. Here a number of inputs are added algebraically to provide a summed output. Examples of such machines are found in the patent to Dietrich et al. U.S. Pat. No. 2,942,496 and Weiland, U.S. Pat. No. 3,457,806.

Other relevant prior art is found in the patent to Geissler et al, U.S. Pat. No. 3,139,033, entitled "Aerodynamically Stable Missile." The missile disclosed in the patent includes jet vanes disposed in the exhaust flow. They are mechanically connected to air fins for simultaneous movement. According to this patent, pitch, yaw and roll commands sent to the air vanes are merely transmitted to the jet vanes.

SUMMARY OF THE INVENTION

In accordance with the present invention, conventional pitch, yaw and roll actuation is applied to the aerodynamic control surfaces. The thrust vector control jet tab, which will be called "tab" hereinafter, is actuated through direct coupling from the aerodynamic surface actuator system. Hence, only a single set of actuators for both the control surfaces and the tabs are required. The same commands that are applied to the aerodynamic surfaces are transmitted by the actuators to the tabs. The actuators employ geared summing mechanisms which remove the roll commands supplied to the aerodynamic surfaces.

In a typical four-finned, aft-mounted aerodynamic control surface rocket vehicle, roll commands may be sent to the aerodynamic control surfaces. However, the commands necessary to cause movement of the aerodynamic vanes for inducing roll are not required for tab control. According to the present invention, the roll information is removed before actuating the jet tabs. Hence only pitch and yaw commands are provided to the tabs. Accordingly, a separate set of powered actuators for the tabs is not necessary. The result is a reduction in weight and simplification of the mechanism for a missile.

In accordance with the present invention, it is also possible to scale the pitch and yaw commands applied to the thrust vector control system in relation to the aerodynamic control surfaces. This is effected by an appropriate design of the dimensions and construction of the mechanism disclosed.

The copending application to Bastian, Ser. No. 924,595 filed July 14, 1978, also discloses a thrust vector control system for jet tabs. In this copending application a cylindrical grooved sleeve is utilized as a summing mechanism. This mechanism also removes roll commands and provides pitch and yaw tab control which may be made linear or non-linear.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
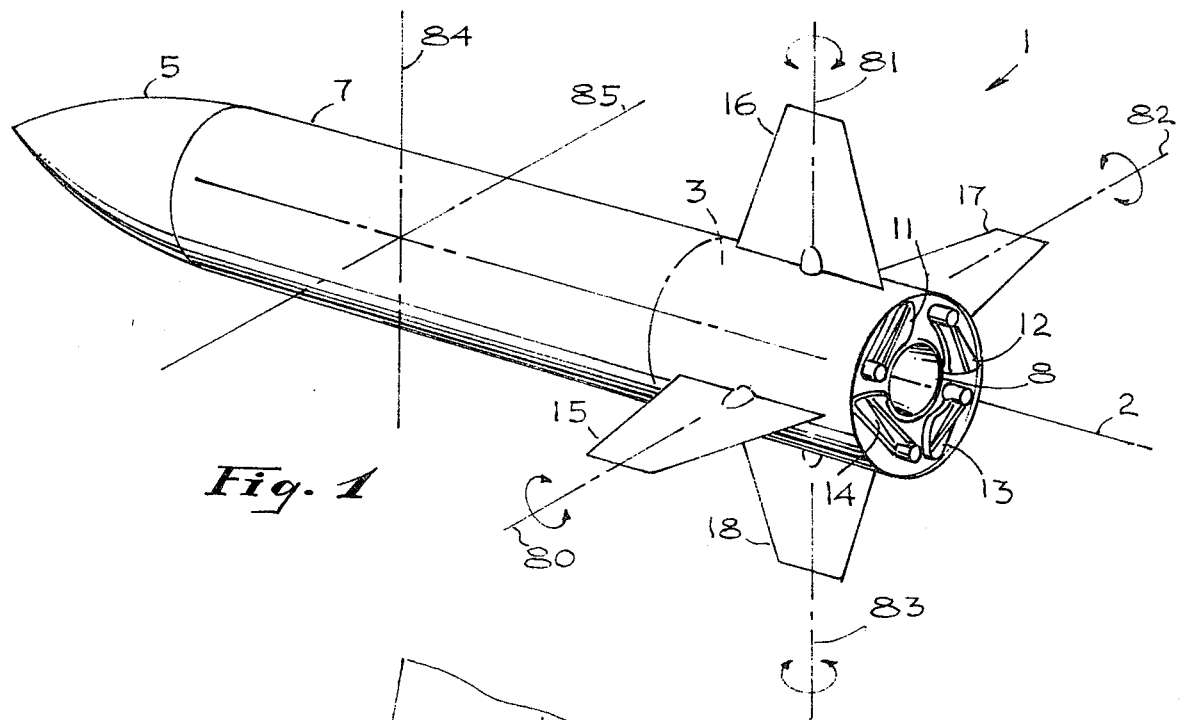
FIG. 1 is a view in perspective of a missile provided with aerodynamic control surfaces and thrust vector control jet tabs.

Referring now to the drawings and particularly to FIG. 1, there is illustrated by way of example a rocket propelled missile 1 embodying the present invention. The missile 1 includes a cylindrical body 7 having a payload compartment or warhead 5 at one end and a rocket engine 3 at the other. The longitudinal axis 2 of the cylindrical body 7 is also shown. The rocket engine 3 provides thrust along the axis 2. The rocket exhaust gas exits through a nozzle 8.

An aerodynamic control surface or fin 15 is mounted on the body 7 for rotation about an axis 80. Similarly fins 16, 17 and 18 are also mounted on body 7 for rotation about their respective axes 81, 82 and 83 in the same manner as fin 15.

Also shown in FIG. 1 are jet tabs 11, 12, 13 and 14 mounted adjacent the rocket nozzle 8. They are arranged to rotate on command into and out of the path of the exhaust gases.

Figure 2:
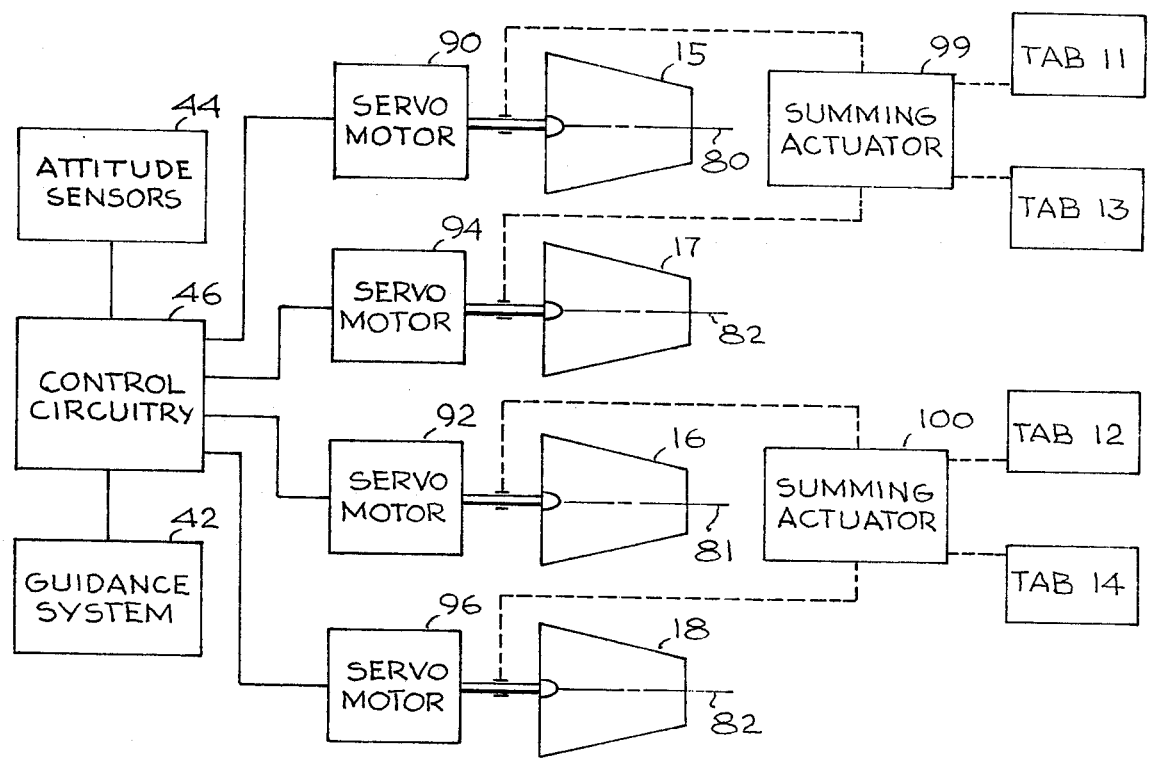
FIG. 2 is a functional block diagram depicting the connections from the guidance and control system to the control surfaces and jet tabs, and including appropriate actuators and summing mechanisms.

As illustrated in FIG. 2, tail fins 15–18 are controlled respectively by servo motors 90, 92, 94 and 96 which are mounted on or preferably in the body 7. For example, activation of servo motor 90 causes rotation of fin 15 about its axis 80. The other fins are rotated in the same manner. The missile shown in FIG. 1 has four fins mounted equidistantly about the circumference of the rear portion of the body 7. In the preferred embodiment, fins 15 and 17 provide pitch attitude control around pitch axis 85. Similarly, fins 16 and 18 provide yaw attitude control around yaw axis 84. Tabs 11 and 13 deflect the exhaust gases to impart pitch moments while tabs 12 and 14 deflect the exhaust gases to provide yaw moments. However, it will be realized that a different number and arrangement of fins and tabs may readily be utilized if desired.

As shown in the block diagram of FIG. 2, guidance information from guidance system 42 and attitude information from attitude sensors 44 are fed to control circuitry 46. The control circuitry 46 in turn sends command signals to the fin servo motors 90, 94 and 92, 96, thus turning the four fins 15, 17 and 16, 18, respectively. The controlled rotation of a pair of fins, such as 15, 17 or 16, 18 in each of the two attitude planes drive in turn one summing actuator which in turn commands an associated pair of opposing tabs.

Thus fins 15 and 17 are coupled to geared summing actuator 99. On the other hand, fins 16 and 18 are coupled to geared summing actuator 100. Geared summing actuator 99 controls or drives tabs 11, 13 while geared summing actuator 100 controls tabs 12, 14. Hence by coupling opposite fins to an associated summing actuator, pitch information imparted to each of the pitch axis fins 15, 17 is transmitted to each of the pitch axis tabs 11, 13. In the same manner, yaw information imparted to each of the yaw axis fins 16, 18 is transmitted to each of the yaw axis tabs 12, 14.

Figure 3:
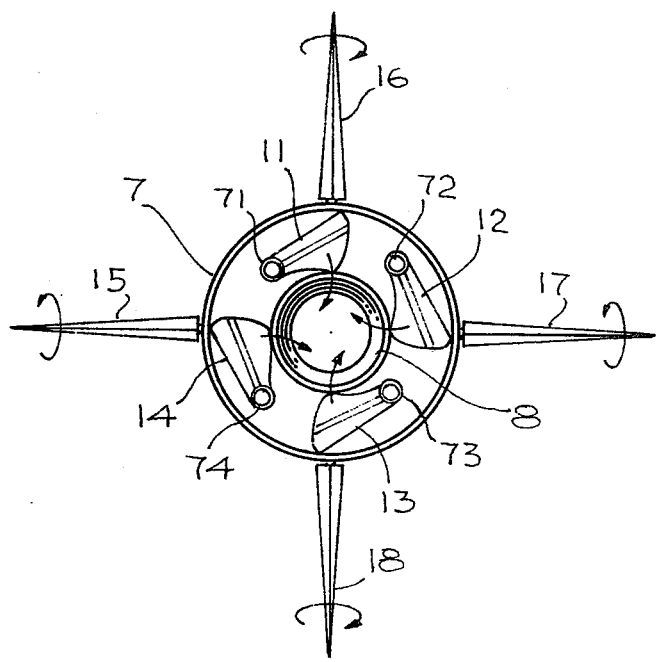
FIG. 3 is a view from behind the missile looking forward and illustrating the relative positions of the aerodynamic control surfaces and jet tabs.

The relative positions of fins 15–18 and the relative positions of tabs 11–14 as arranged about the exhaust nozzle 8 are illustrated in FIG. 3. Each of the fins 15–18 turn on their respective axes in the aerodynamic flow. Tabs 11–14 rotate on their respective tab shafts 71, 72, 73 and 74 into or out of the path of the exhaust nozzle 8. Each of the four tabs moves independently in accordance with the pitch and yaw control provided by the coupled actuators to be described herein. The extent of the insertion of each tab into the exhaust flow determines the amount of deflection of the exhaust flow. This in turn determines the magnitude of the component of the induced pitch or yaw moment.

Figure 4:
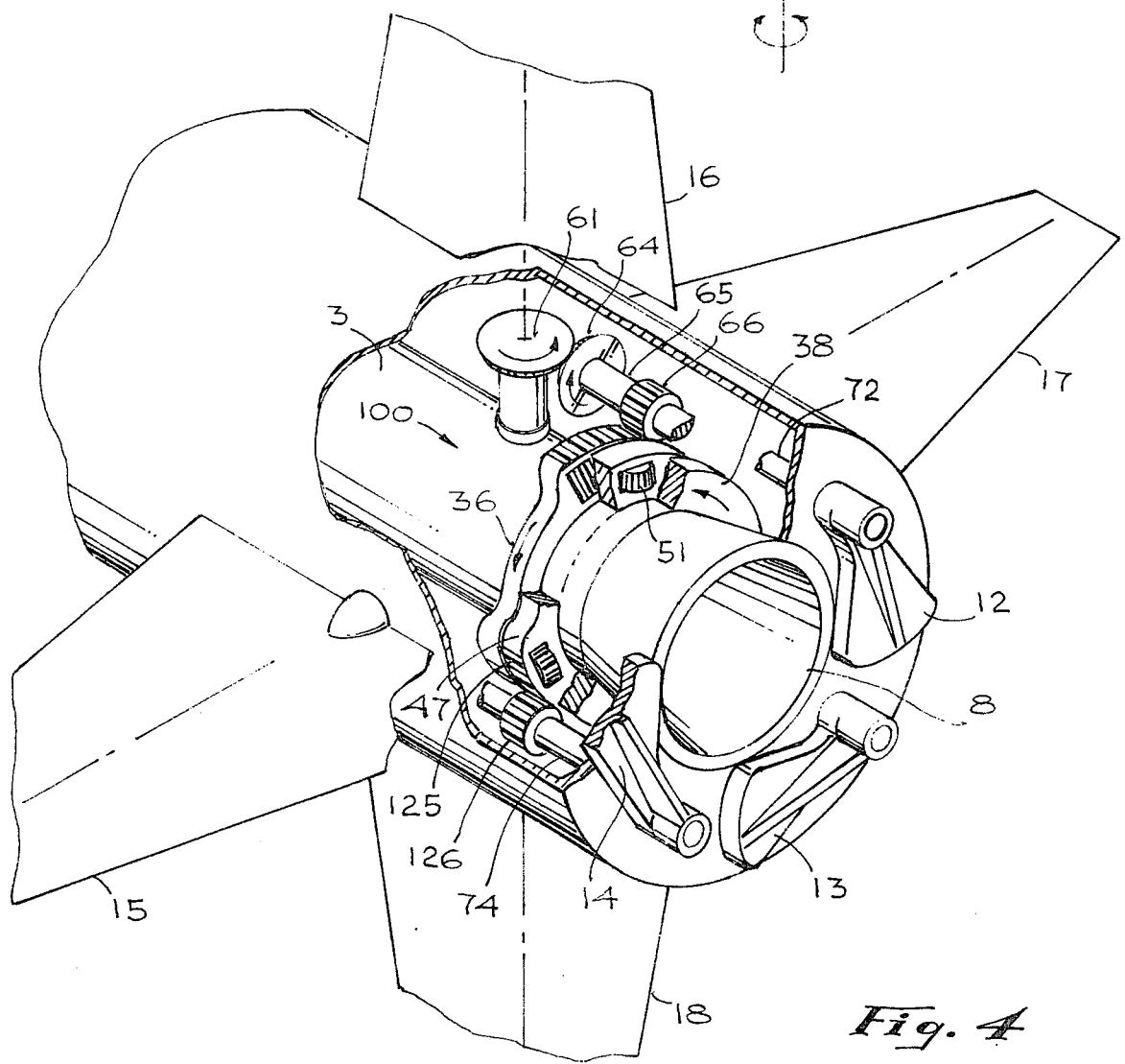
FIG. 4 is a partial view in perspective, parts being broken away, of particular portions of a geared summing actuator in accordance with the present invention.
Figure 5:
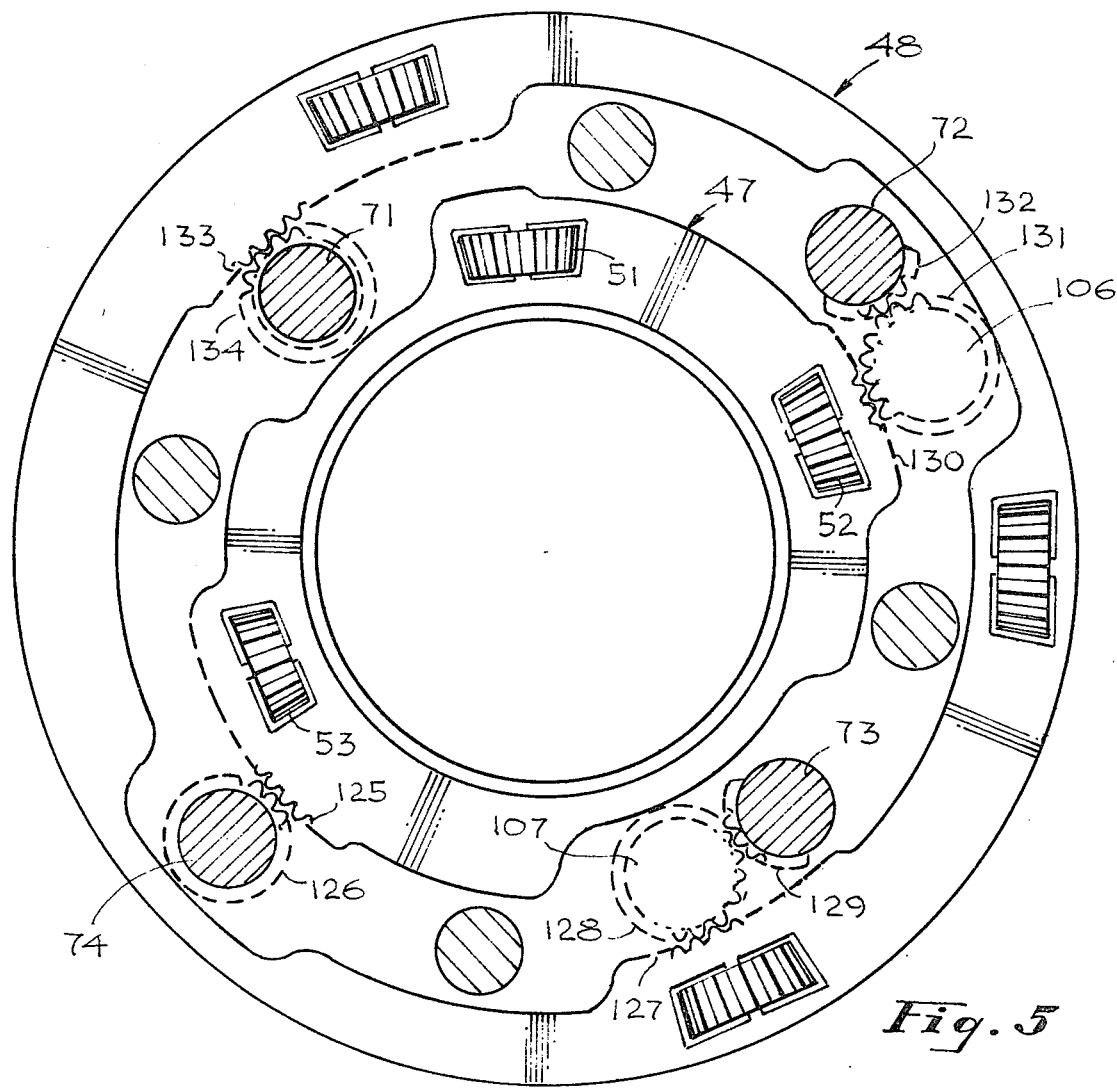
FIG. 5 is a cross-sectional view of the summing gear for actuating two pairs of jet tabs.

The geared summing actuator 100 is illustrated in detail in FIG. 4. For simplicity, the elements comprising the summing actuator 99 are omitted from FIG. 4, but their interrelationship with the actuator 100 is shown in FIG. 5. Yaw and roll commands supplied to fin 16 are simultaneously applied to fin shaft drive gear 61. The drive gear 61 in turn transmits commands to an input shaft gear 64 which turns input shaft 65. Input shaft 65, through a gear 66, drives a control ring gear 36. Yaw and roll commands supplied to fin 18 are similarly applied to a control ring gear 38. Ring gears 36 and 38 are arranged to rotate in planes parallel to each other and are concentric with the outer diameter of the rocket motor 3. Ring gears 36 and 38 are arranged to turn in one direction in response to yaw right commands and to turn in the opposite direction for yaw left commands.

Ring gears 36 and 38 are separated from each other by a summing gear 47. Ring gear 36 has gear teeth on its outer edge to receive rotational input from gear 66. Ring gear 38 is similarly constructed to receive rotational input. Ring gears 36 and 38 also each have gear teeth on their faces adjacent to the summing gear 47. Summing gear 47 has planetary gears 51 and 52 (see also FIG. 5) arranged to freely turn on axes radiating from the center of each gear. The summing gear 47 is also provided with an additional planetary gear 53. Summing gear 47 is disposed concentric to rocket motor 3 and is arranged to turn freely about its axis. It has a diameter and size similar to those of ring gears 36 and 38.

Concerning the detailed construction of the summing gears 47 and 48, reference is now made to FIG. 5. The three planetary gears 51, 52, and 53 of summing gear 47 are spaced circumferentially to properly distribute the rotational forces. Each of the planetary gears 51–53 mesh with adjacent teeth in ring gears 36 and 38. For example, planetary gear 51 engages the face gears of ring gears 36 and 38. Planetary gears 52 and 53 each engage both ring gears 36 and 38 on each side of planetary gear 51. Consequently, if ring gear 36 and 38 both move in the same direction, summing gear 47 will also move in the same direction. On the other hand, if ring gears 36 and 38 turn equally in opposite directions, summing gear 47 will remain stationary. Since ring gears 36 and 38 turn in the same direction for yaw commands and turn in opposite directions in response to roll commands, the motion of summing gear 47 does not have a roll component.

Summing gear 47 has gear teeth 125 on its outer edge to drive tab shaft 74 through its gear teeth 126. The axis of tab shaft 74 is disposed at 90° to the plane of summing gear 47. Tab shaft 74 is connected to tab 14 and is arranged to rotate with rotational inputs from summing ring 47. Rotation of summing ring 47, therefore, turns tab 14 into and out of the path of the rocket motor exhaust flow and is responsive to yaw commands.

Summing ring 48 provides pitch commands to tabs 12 and 14. Summing ring 47 has on its outer edge, gear teeth 130 which engage gear teeth 131 of idler 106. Tab shaft 72 with gear teeth 132 is also arranged so that its axis is at 90° to the plane of rotation of summing gear 47. Accordingly, idler gear teeth 131 mesh with tab shaft gear teeth 132. Tab 12 is connected to tab shaft 72. Idler 106 is arranged to turn freely with the rotation of summing ring 47. By the use of idler 106, rotation of summing ring 47 causes tab shaft 72 and tab 12 to turn in the direction opposite to that of tab 14. Hence when tab 14 is moved into the rocket motor exhaust stream, tab 12 rotates away from the exhaust. Thus, at any time only one of the two tabs is driven into the rocket motor exhaust flow, thereby inducing a yaw motion.

Pitch commands applied to fins 15, 17 are transmitted to tabs 11, 13 through geared summing actuator 99 in the same manner as yaw commands were transmitted from fin 16, 18 to tabs 12, 14 by geared summing actuator 100 in the manner described above. In order to conserve space, geared summing actuator 100 is arranged concentric with geared summing actuator 99. Whereas the input and output gear teeth are arranged on the outer diameter surfaces of the ring gears and summing ring in geared summing actuator 100, the ring gears in summing ring and geared summing actuator 99 are constructed so that input and output gear teeth are arranged on the inner surfaces of the ring gears in the summing gear. Consequently, summing ring 48 has gear teeth 127 and 133 on the inner diameter surfaces of the summing ring 48. Gear teeth 127 mesh into idler gear teeth 128 and drive tab shaft gear teeth 129 on tab shaft 73 which turn pitch axis tab 13 into and out of the exhaust gas flow. Similarly tab shaft 71 which controls tab 11 is driven by its gear teeth 134 meshing with gear teeth 133 on the inner edge of summing ring 48.

While the planes of summing rings 47 and 48 are parallel, they may be separated by a sufficient distance as required to provide space for the drive gears for the fin shafts and the input drive gears.

Figure 6:
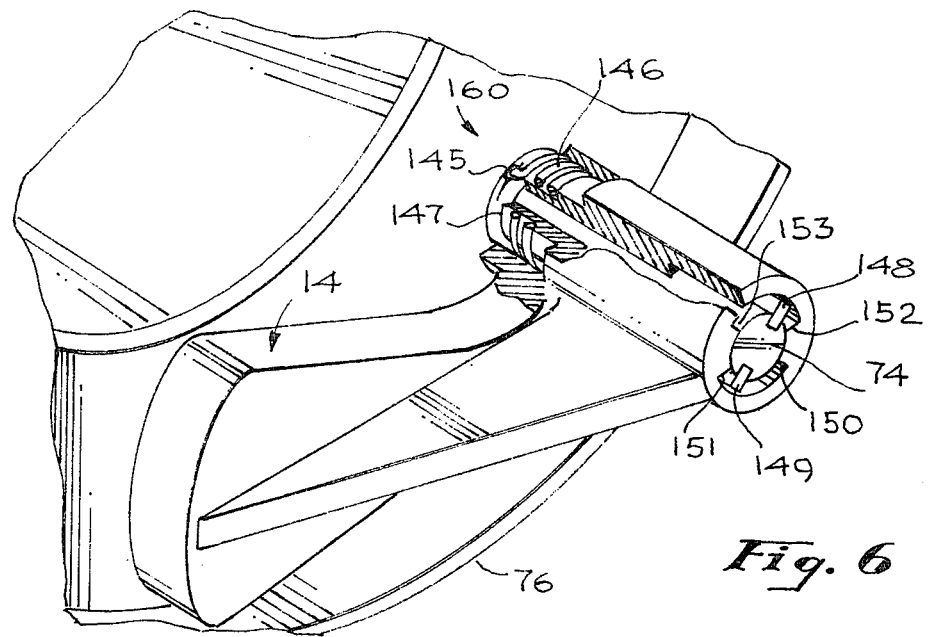
FIG. 6 is a view in perspective of one of the jet tabs with its spring return connection to its tab shaft.

The spring return connection between tab 14 and its tab shaft 74 is illustrated in FIG. 6 to which reference is now made. As explained before, when tab 14 rotates into the exhaust gas flow of the rocket motor, tab 12 may turn in the opposite direction. Hence excess rotation away from the rocket motor exhaust flow may cause tab 12 to rotate into the aerodynamic flow beyond the skin of the missile. Hence the rotation of tab 12 preferably is limited away from the center of its path. Spring return connection 160 prevents this undesirable rotation while at the same time, allowing appropriate rotation of tab 12 into the exhaust gas flow of the rocket motor when so commanded.

Except as described hereinbelow, tab 14 rotates on tab shaft 74. However, the construction of FIG. 6 provides for a lost motion. To this end, tab shaft 74 has keys 148 and 149 disposed in opposite radial directions from the axis of the tab shaft. Tab 14 is arranged with key stops 150, 151 and 152, 153, which may stop the motion of keys 148 and 149. Keys 148 and 149 rotate tab 14 into the rocket motor exhaust flow through key stops 150 and 152, respectively. Key stops 151 and 153 are so spaced that opposite rotation of keys 148 and 149 do not drive tab 14 out of the skin or envelope of the missile body.

Spring 146 has one end attached to the base of tab 14 and its other end to the missile body by spring end 145 which is inserted into the missle body. Spring 146 is coiled about tab handle 147 cut into tab 14 and concentric to the axis of tab shaft 72. Accordingly, tab 14 is retracted from or out of the path of the motor exhaust flow unless it is driven by keys 148 or 149. Missile skin 76 acts as a stop to prevent rotation of the tab 14 beyond the missile body envelope.

It will, of course, be obvious that the other tabs, such as 11, 12 and 13 may have the same construction.

As pointed out hereinbefore, it may be desirable to provide a non-linear relationship between the rotation of fins and tabs. At low speeds of the missile, aerodynamic effects of the fins may be low. Similarly, at high altitudes, the effects of the aerodynamic surfaces may be limited because the atmospheric pressure is low. It may, hence, be desirable to provide more thrust vector control, both at low speeds and at high altitudes.

Figure 7A:
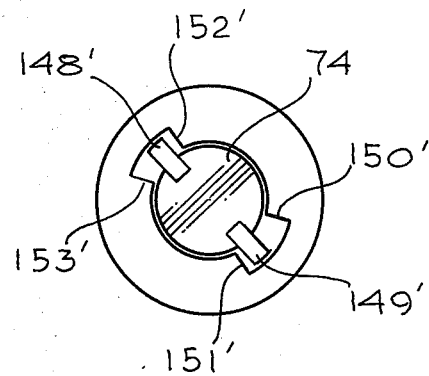
FIGS. 7A and 7B are end views of two alternative shaft and key arrangements for the structure shown in FIG. 6.
Figure 7B:
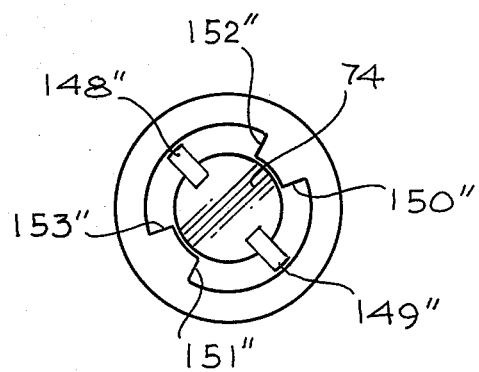

In FIGS. 7A and 7B, the non-linear relationship is shown. It is afforded by varying the amount of rotation of keys 148' and 149' and stops 151' and 152' (FIG. 7A). The key and stop arrangement herein functions in the same manner as it does in FIG. 6, but in FIG. 7A rotation of the tab is effected sooner. In FIG. 7B, on the other hand, rotation of the tab would not occur as early. The gear ratios used in the summing actuator shown in FIG. 5 effect the amount of rotation of shaft 74, per increment of rotation of a fin. Thus, by proper selection of gear ratios in the summing actuator, and by the proper arrangement and location of key stops 150', 152', rotation of the tab 14 into the rocket motor exhaust flow may be prevented until commands of high magnitude are received from the tab shafts 74. Of course, similar relations between the yaw commands supplied to fins 16, 18 and yaw commands to tabs 12, 14 are preferably established. Other desirable relationships between the rotation of the fins and associated tabs may be established in a similar manner.

Although there has been described above one specific arrangement of an aerodynamic control mechanism for thrust vector control in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An attitude control system for a rocket propelled missile comprising:
   a cylindrical missile body;
   rocket propulsion means acting along the axis of the body to propel the missile;
   a plurality of control elements pivotably mounted external to the body, each being pivotable about an axis normal to the cylindrical surface of the missile body for aerodynamically controlling direction of the missile in flight;
   a servo motor associated with each control element for controlling the angular position of the control elements relative to the missile body;
   control circuitry for activating the servo motors to control the flight of the missile;
   a plurality of thrust vector control jet tabs for providing pitch and yaw moments by deflecting the rocket exhaust gas;
   a plurality of geared summing actuators, each for rotating two of said tabs, each geared summing actuator including:
   means for receiving pitch or yaw commands or combinations thereof and for receiving roll commands provided to said fins; and
   gear means for removing the roll component from the commands while retaining the pitch and yaw components and actuating a selected one of said tabs with the resultant command.

2. The control system of claim 1 wherein said geared summing actuators further include delay means effective to delay the rotation of the selected tab until the associated control element has pivoted a fixed amount.

3. The control system of claim 2 wherein the delay means includes a keyed shaft cooperating with a slotted cylinder wherein the key moves within the slot prior to contacting an inner surface of the slot to effect rotation of the tab.

4. The control system of claim 1 wherein there are two pairs of control elements, each spaced equidistant around the missile body.

5. The control system of claim 4 wherein there are two actuators, and each actuator further includes a pair of driven gears, each pair of gears being driven by one of the opposed pair of control elements.

6. The apparatus of claim 5 wherein a third geared member is interspersed between said pair of driven gears, is driven thereby and is further interconnected with said tabs.

7. The control system of claim 5 wherein said actuators further include delay means effective to delay the actuation of said one tab until after pivoting of said control elements is effected through a predetermined arc.

8. The control system of claim 7 wherein the delay means includes a keyed shaft cooperating with a slotted cylinder wherein the keys move within the slot prior to contacting the surface of the slot to effect rotation of the tab.

9. An attitude control system for a rocket propelled missile conprising:
   a cylindrical missile body;
   rocket propulsion means acting along the axis of the body to propel the missile;
   four fins pivotably mounted to and disposed symmetrically and exteriorly of the body and each being pivotable about an axis normal to the cylindrical surface of the missile body for aerodynamically controlling directions of the missile in flight, each pair of two fins being disposed opposite to each other;
   a servo motor associated with each fin for controlling the angular position of the fin relative to the missile body;
   control circuitry for commanding the servo motors to control the flight of the missile;
   a plurality of thrust vector control jet tabs for providing pitch and yaw moments by deflecting rocket exhaust gas;
   actuator means interconnected with said tabs including:
   means for receiving commands from said circuitry;
   two sets of ring gears arranged to turn in parallel planes, one of said sets receiving pitch commands and the other receiving yaw commands, and both receiving roll commands provided by said circuitry to said servo motors, each ring gear having gear teeth on the faces between the two ring gears and being connected to one of said pair of two opposite fins so that pitch or yaw servo commands cause said ring gears to rotate in the same direction, while roll commands cause the rotation of said ring gears in opposite directions;
   a pair of summing rings arranged to turn in a plane parallel to the ring gear planes, one of each of said summing rings being disposed between each set of ring gears and having a plurality of planetary gears turning on axes radiating from the center of the summing ring, each planetary gear engaging gear teeth on the face of a ring gear, and arranged so that the summing ring does not rotate in response to equal but opposite rotation of said ring gears but does rotate in response to rotation of said ring gears in the same direction, said summing rings having gear teeth on their circumference; and
   a tab shaft connected at one end to an associated tab and having a gear at the other end interconnecting with said circumferential gear teeth on one of said summing rings, whereby said tab is rotatable in and out of the missile exhaust gas flow in response to rotation of the summing ring.

10. The control system of claim 9 wherein each tab shaft has at least one key radiating from the shaft and mating with the associated tab, said associated tab having at least one key stop, said key being effective to rotate the tab into the missile exhaust flow when turned in one direction and not effective to rotate said tab into the aerodynamic air flow beyond the skin of the missile when rotated in the opposite direction.

11. The control system of claim 10 further including spring means effective to rotate the tab away from exhaust gas flow when not rotated thereinto by said key.

12. The control system of claim 11 wherein said key and key stop further includes delay means effective to delay the actuation of said one tab until after pivoting of said fins is effected through a predetermined arc.

13. The control system of claim 12 wherein the keys move adjacent the stop prior to contacting the stop to effect rotation of the tab.

* * * * *